(12) United States Patent
Park et al.

(10) Patent No.: US 9,427,700 B2
(45) Date of Patent: Aug. 30, 2016

(54) MULTILAYER MODULE FOR HYDROGEN SEPARATION

(75) Inventors: Jong-Soo Park, Daejeon (KR);
 Kyung-Ran Hwang, Daejeon (KR);
 Shin-Kun Ryi, Daejeon (KR);
 Chun-Boo Lee, Daejeon (KR);
 Sung-Wook Lee, Jeollanam-do (KR);
 Jin-Woo Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 14/354,346

(22) PCT Filed: Aug. 8, 2012

(86) PCT No.: PCT/KR2012/006302
 § 371 (c)(1),
 (2), (4) Date: Jun. 4, 2014

(87) PCT Pub. No.: WO2013/065935
 PCT Pub. Date: May 10, 2013

(65) Prior Publication Data
 US 2014/0298994 A1    Oct. 9, 2014

(30) Foreign Application Priority Data

Nov. 1, 2011  (KR) .................. 10-2011-0112922

(51) Int. Cl.
 *B01D 53/22*  (2006.01)
 *B01D 63/08*  (2006.01)
 *C01B 3/50*  (2006.01)

(52) U.S. Cl.
 CPC ........... *B01D 53/228* (2013.01); *B01D 53/227* (2013.01); *B01D 63/082* (2013.01); *C01B 3/503* (2013.01); *B01D 53/22* (2013.01); *B01D 2313/10* (2013.01); *B01D 2319/04* (2013.01)

(58) Field of Classification Search
 CPC .. B01D 53/22; B01D 53/225; B01D 53/226; B01D 53/227; B01D 53/228; B01D 63/082; B01D 2313/10; B01D 2319/02; B01D 2319/04; C01B 3/503
 USPC .................................. 96/7, 9, 11; 95/55, 56
 See application file for complete search history.

(56) References Cited

U.S. PATENT DOCUMENTS

| 3,854,904 | A | * | 12/1974 | Jamet ................................. 96/7 |
| 3,881,897 | A | * | 5/1975 | Faure et al. ........................ 96/9 |
| 3,925,037 | A | * | 12/1975 | Ward et al. ........................ 96/5 |
| 4,430,218 | A | * | 2/1984 | Perl et al. ................ 210/321.75 |

(Continued)

FOREIGN PATENT DOCUMENTS

| JP | 2005-288290 A | 10/2005 |
| JP | 2010-137160 A | 6/2010 |

(Continued)

*Primary Examiner* — Jason M Greene
(74) *Attorney, Agent, or Firm* — NovoTechIP International PLLC

(57) ABSTRACT

The present invention relates to a multilayer module for hydrogen separation using a pressure-resistant chamber so that unit cells using a metal separation membrane through which only hydrogen selectively passes are stacked to improve separation efficiency, and a mixed gas is uniformly supplied into each of the unit cells. In the multilayer module, the unit cells are stacked on each other, and the mixed gas is supplied into the chamber. Also, mixed gas input ports are each disposed in the side surfaces of the unit cells to supply the mixed gas.

5 Claims, 11 Drawing Sheets

(56) References Cited

U.S. PATENT DOCUMENTS

| | | | |
|---|---|---|---|
| 5,536,405 A * | 7/1996 | Myrna et al. | 96/11 |
| 6,319,306 B1 * | 11/2001 | Edlund et al. | 96/7 |
| 6,419,726 B1 * | 7/2002 | Frost et al. | 95/56 |
| 6,764,787 B2 * | 7/2004 | Grasso et al. | 96/7 |
| 7,585,355 B2 * | 9/2009 | Gonjo et al. | 96/9 |
| 7,658,788 B2 * | 2/2010 | Holmes et al. | 96/7 |
| 2006/0162563 A1 * | 7/2006 | Poschmann | 96/9 |
| 2008/0311013 A1 * | 12/2008 | Gernot et al. | 422/191 |
| 2009/0145831 A1 * | 6/2009 | Manabe et al. | 210/232 |

FOREIGN PATENT DOCUMENTS

| | | |
|---|---|---|
| JP | 2010-155178 A | 7/2010 |
| KR | 10-0668647 B1 | 1/2007 |
| KR | 10-2007-0068394 A | 6/2007 |
| KR | 10-2009-0116563 A | 11/2009 |

* cited by examiner

MULTILAYER MODULE FOR HYDROGEN SEPARATION

TECHNICAL FIELD

The present invention relates to a multilayer module for hydrogen separation, and more specifically to a multilayer module for hydrogen separation using a pressure chamber in which unit cells including metal separation membranes to selectively pass hydrogen therethrough are laminated, so that a uniform supply of mixed gases is provided to each unit cell with improved separation efficiency.

BACKGROUND ART

As a technique for separating hydrogen from hydrogen mixed gases, a variety of methods such as PSA, deep freezing, chemical adsorption and separation membrane may be used.

Of the above technologies, a separation process using separation membranes is known to be the best in terms of energy efficiency. Recently, development of a separation process using hydrogen membranes to commercialize an extra-large refining portion such as pre-firing CCS (carbon capture and storage) is under way.

In order to have the above process completed, a module configuration technique, whereby high efficiency and durability can be provided so that first the hydrogen penetration speed and durability of the separation membrane itself are ensured and second the performance of separation membrane can be well displayed, is a key point.

There has been much research into module configuration for hydrogen refining using a separation membrane, and such research was conducted from the standpoint of securing high-concentration hydrogen that has penetrated the separation membrane.

However, in a separation membrane-applied process which needs to satisfy hydrogen refining and $CO_2$ concentration simultaneously as in pre-firing CCS, it is not possible to obtain a concentration of residual gas at a certain level or more unless the recovery rate of hydrogen is maintained high. That is, when removing hydrogen from mixed gases, diffusion of material above the separation membrane acts as a dominant factor for the hydrogen removal efficiency of the separation membrane, because the concentration of hydrogen in residual gases that have not penetrated the separation membrane decreases gradually. Therefore, the configuration of the separation membrane exerts an absolute influence.

A unit module requires minimization of the mixed gas flow space so that the mass transfer resistance can be minimized according to the above configuration, and along with the unit cell having such a configuration, it requires a method of increasing the capacity of a module with a multistage configuration so that mixed gases can be supplied uniformly to each unit cell.

U.S. Pat. Nos. 6,319,305 and 5,997,594 disclose a unit module extension method. In the inventions of the above patents, since a gas supply unit is connected to a discharge unit through one communication hole, a difference in gas supply pressure transmitted according to the increase of the number of unit cells to be laminated may occur. Thus, as it becomes farther away from a supply hole, the feed rate of mixed gas supplied to the unit cell decreases gradually. Of course, such a problem can have its effect minimized by increasing the size of the communication hole infinitely, but as the unit module cross sectional area increases, the costs and size of the refining apparatus increase enormously to cause competitiveness to decrease by half.

Further, the above multilayered module can be sealed by diffusion bonding of the component plates or placing covers above and below the module and then fastening by a plurality of bolts. However, the above configuration makes it difficult to secure durability because expansion pressure is applied to the connecting part of the unit cell according to the supply of high-pressure mixed gas to the module. Especially in the case of pre-firing CCS, the pressure of the separation process is aimed at 68 bars as a development goal. Accordingly, development of a module that can endure high pressure is indispensable.

Further, recently a process, in which hydrogen from hydrogen mixed gas and the gas mixed in it need to be enriched to a certain concentration, is becoming increasingly popular. Typically in the case of the pre-firing CCS field, effort is being made for solving a technically intractable problem wherein the extent of enrichment of $CO_2$, which is an impermeable gas, is to be satisfied simultaneously with the separation of hydrogen.

SUMMARY OF THE INVENTION

Problems to be Solved by the Invention

Thus, in consideration of the above-described circumstances, it is an object of the present invention to provide a multilayer module for hydrogen separation using a pressure chamber in which unit cells including metal separation membranes to selectively pass hydrogen therethrough are laminated, so that a uniform supply of mixed gases is provided to each unit cell with improved separation efficiency.

Another object of the present invention is to provide a multilayer module for hydrogen separation which is easy to join and seal by configuring the modules in such a way that expansion pressure is not applied to a bonding or seal during the separation process operation.

In particular, as an indispensable item for commercializing a large-capacity process, a module scale-up art is needed. Therefore, the present invention provides a technique of scale-up by laminating of unit cells.

Means for Solving the Problems

A major feature of the present invention is that unit cells are laminated in a pressure chamber, and a mixed gas is supplied into the pressure chamber. In addition, each of the unit cells includes a mixed gas inlet port so as to supply the mixed gas to a side of the unit cells. Accordingly, the pressure of the inner space of the pressure chamber is increased by the mixed gas supplied therein, and thereby providing effects offsetting the pressure therein to be expanded to the outside.

In order to achieve the above objects, there is provided a multilayer module for hydrogen separation including: a pressure chamber having a mixed gas supply pipe which is disposed on a side thereof so as to be communicated therewith; and a separation unit which is installed in the pressure chamber, wherein the separation unit includes: at least two laminated unit cells which are configured to separate hydrogen from a mixed gas; an upper plate which is placed on the laminated unit cell at an uppermost side; and a lower plate which is placed on the laminated unit cell at a lowermost side, at least one of the upper plate and the lower plate includes a hydrogen gas discharge pipe which are disposed thereon to discharge hydrogen separated from the separation unit, at least one of the upper plate and the lower plate includes a retentate gas discharge pipe which are disposed thereon to discharge a remaining retentate gas from which hydrogen has been separated by the separation unit, each of the unit cells is communicated with an inner space of the pressure chamber.

Preferably, the unit cell includes: a cell body forming a main body of the unit cell; support protrusions formed on an upper recessed section of the cell body; a hydrogen separation plate which is disposed on the support protrusions to pass only hydrogen therethrough; a mixed gas communication hole, a retentate gas communication hole, and a hydrogen gas communication hole, which are formed in the cell body around the hydrogen separation plate, so as to be spaced apart from each other; a mixed gas input port which is formed in circumferential surfaces thereof to be communicated with the mixed gas communication hole, and is exposed to the inner space of the pressure chamber to be communicated therewith; a mixed gas outlet hole which is communicated with the mixed gas communication hole through a mixed gas passage, and is formed in the bottom of the cell body to be exposed to a hydrogen separation plate of the unit cell adjacent thereto; a retentate gas input hole which is communicated with the retentate gas communication hole through the retentate gas passage, and is formed in the bottom of the cell body to be exposed to the hydrogen separation plate of the unit cell adjacent thereto; a hydrogen gas inlet hole which is formed between the support protrusions and the lower portion of the hydrogen separation plate, and is communicated with the hydrogen gas communication hole through hydrogen gas passage, the hydrogen gas discharge pipe is communicated with the hydrogen gas communication hole, the retentate gas discharge pipe is communicated with the retentate gas communication hole, and a gap is formed between a lower surface of the upper unit cell and the hydrogen separation plate in the adjacent unit cells so as to communicate the mixed gas outlet hole with the retentate gas inlet hole therethrough.

Alternately, when either of the upper plate or the lower plate has the same configuration as the unit cell, while properly closing the gas communication holes, it is possible to increase the utilization of the lower plate. For this, either of the upper plate or the lower plate has the same configuration as the unit cell, the mixed gas communication hole is closed, the hydrogen gas discharge communication hole in which the hydrogen gas discharge pipe is not inserted is closed, and the retentate gas discharge hole in which the retentate gas discharge pipe is not inserted is closed.

In addition, a gasket may be disposed between the upper surface of the lower plate and the lower surface of the unit cell. In this regard, it is possible to prevent the mixed gas form flowing between the upper surface of the lower plate and the lower surface of the unit cell.

Preferably, the retentate gas inlet hole has a diameter smaller than the diameter of the mixed gas outlet hole. Therefore, by increasing the pressure applied to the retentate gas discharging from the retentate gas inlet hole, hydrogen may easily move through the hydrogen separation plate by the increased pressure.

Preferably, the mixed gas supply pipe has a diameter larger than the diameter of the retentate gas outlet hole. Due to the generation degree of differential pressure at the retentate gas discharge side is higher than the retentate gas supply side, the mixed gas may be always uniformly supplied to the surface of the hydrogen separation plates with improved reliability.

According to the present invention having the above-described configuration, the unit cells are pressurized by the mixed gas supplied through the pressure chamber, and the mixed gas is supplied into each of the unit cells via the mixed gas input ports which are formed in the circumferential surfaces of the unit cells. Therefore, expanding pressure is not applied to the bonding and sealing regions in the module, and a mixture is transferred into each unit cell at the same pressure. Thereby, it is possible to provide a high efficiency large sized module with improved durability.

Effects of the Invention

According to the present invention, it is possible to solve the problem of performance lowering and life shortening of a hydrogen separation membrane that was caused by diffusion bonding between the conventional hydrogen separation membrane and the unit cell, by using the inner seal and outer seal to cut off damage to the separation membrane due to inflow of external oxygen during high-temperature operation and risk factors associated with the outflow of internal hydrogen.

In addition, by substituting an upper flange and lower flange for the housing chamber, it has an advantage that it is possible to configure a hydrogen refining separation membrane module having a simple and compact structure. Through this, it is possible to reduce the costs for system configuration and easily assemble and disassemble the system.

In particular, since it is possible to freely select the installation position of a hydrogen gas discharge pipe and retentate gas discharge pipe, the degree of freedom of the system design may be improved.

Due to the module extension technique according to the present invention, it has become possible to configure a large sized module capable of enriching the gas that has not passed through the separation membrane as in hydrogen refining and CCS. Therefore, hydrogen refining, in particular, actualization of the CCS field for enriching the impermeable gas has become possible. Thus, it is possible to provide a core technique to the process for collecting global warming gases, such as $CO_2$, simultaneously with hydrogen energy production.

DESCRIPTION OF REFERENCE NUMERALS

Hereinafter, exemplary embodiments of the present invention will be described in detail with reference to the accompanying drawings illustrating the structure and operation thereof.

Figure 1:
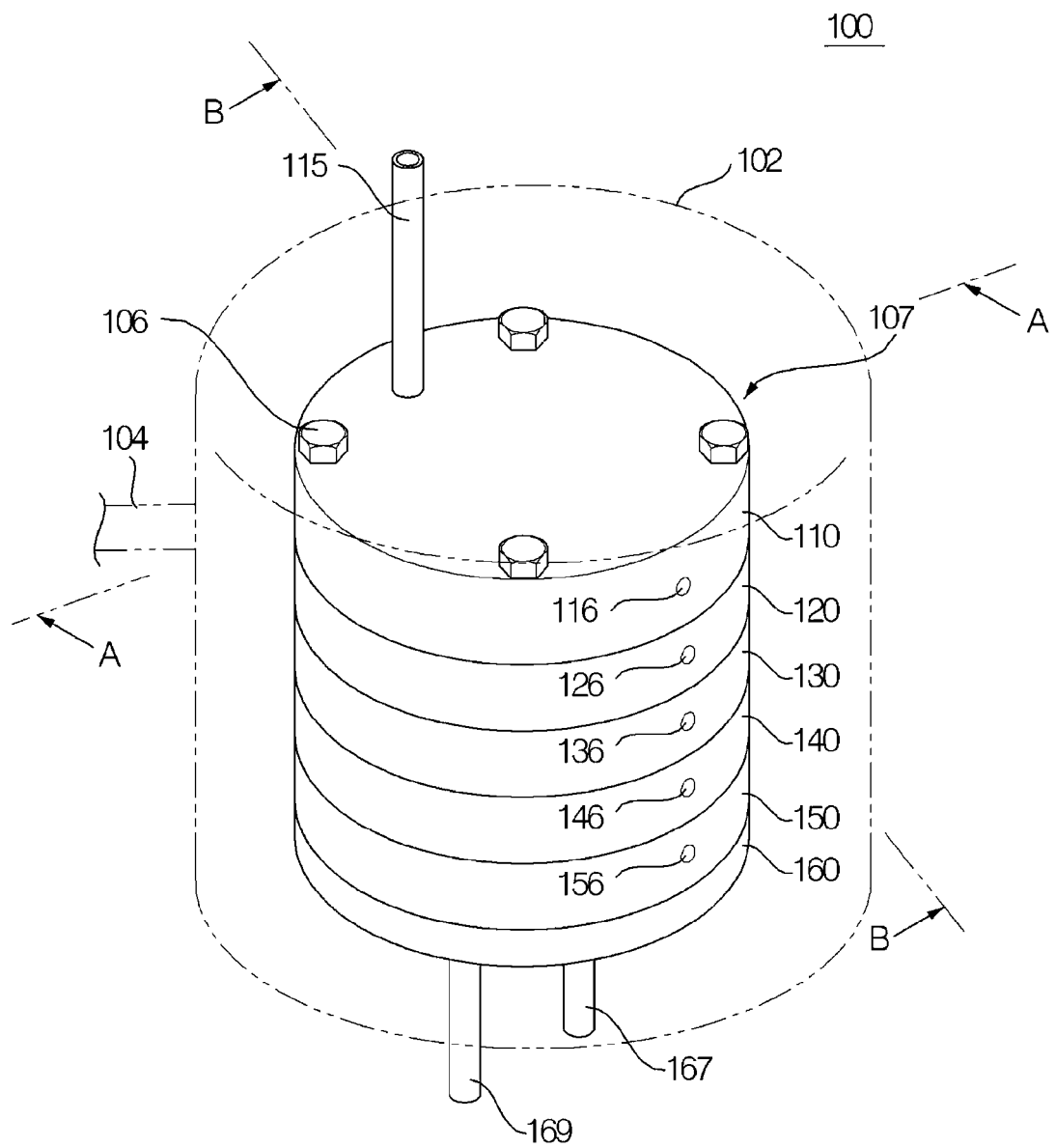
FIG. 1 is a perspective view of a multilayer module for hydrogen separation according to an embodiment of the present invention.
Figure 2:
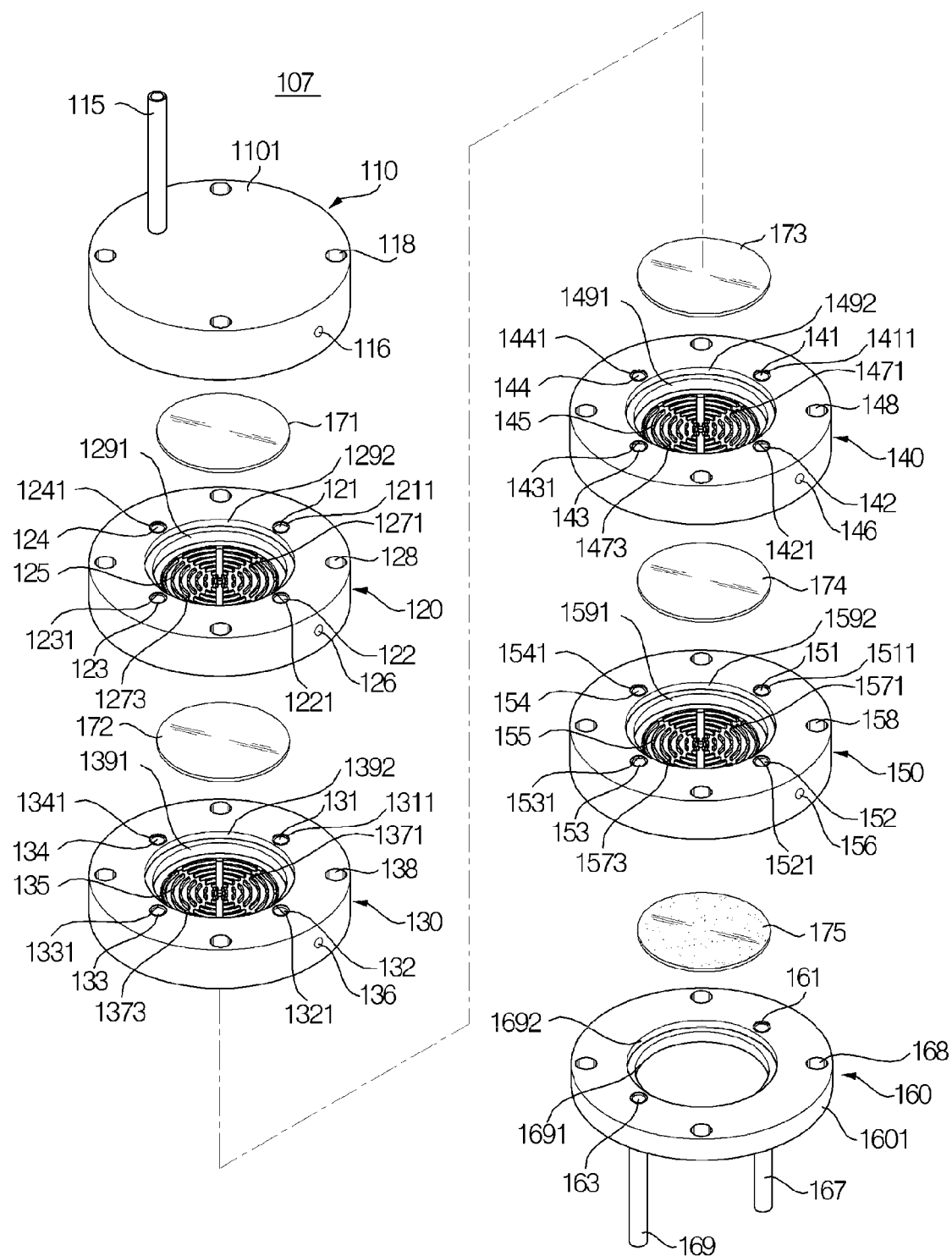
FIG. 2 is an exploded perspective view of a separation unit of the multilayer module for hydrogen separation of FIG. 1 as seen from an upper side.
Figure 3:
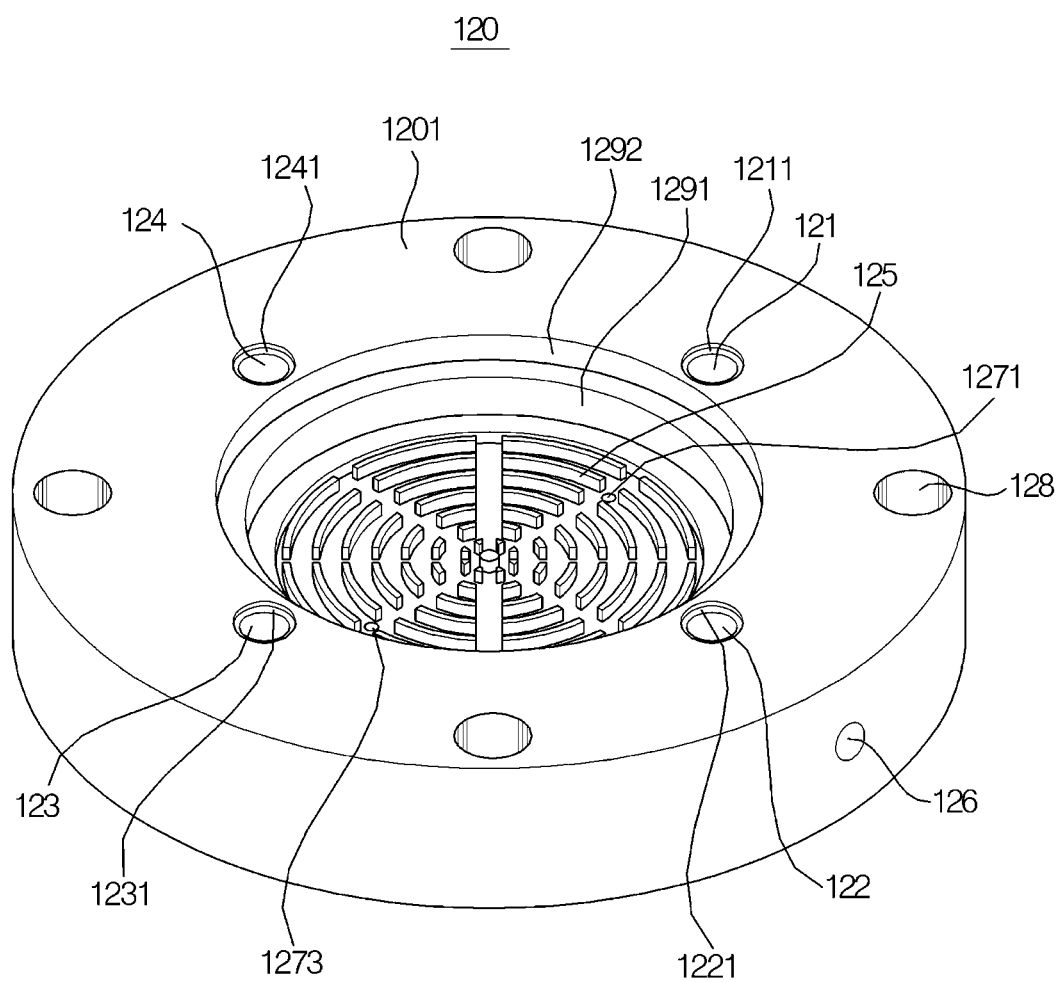
FIG. 3 is a perspective view of a unit cell of the multilayer module for hydrogen separation of FIG. 1 as seen from the upper side.
Figure 4:
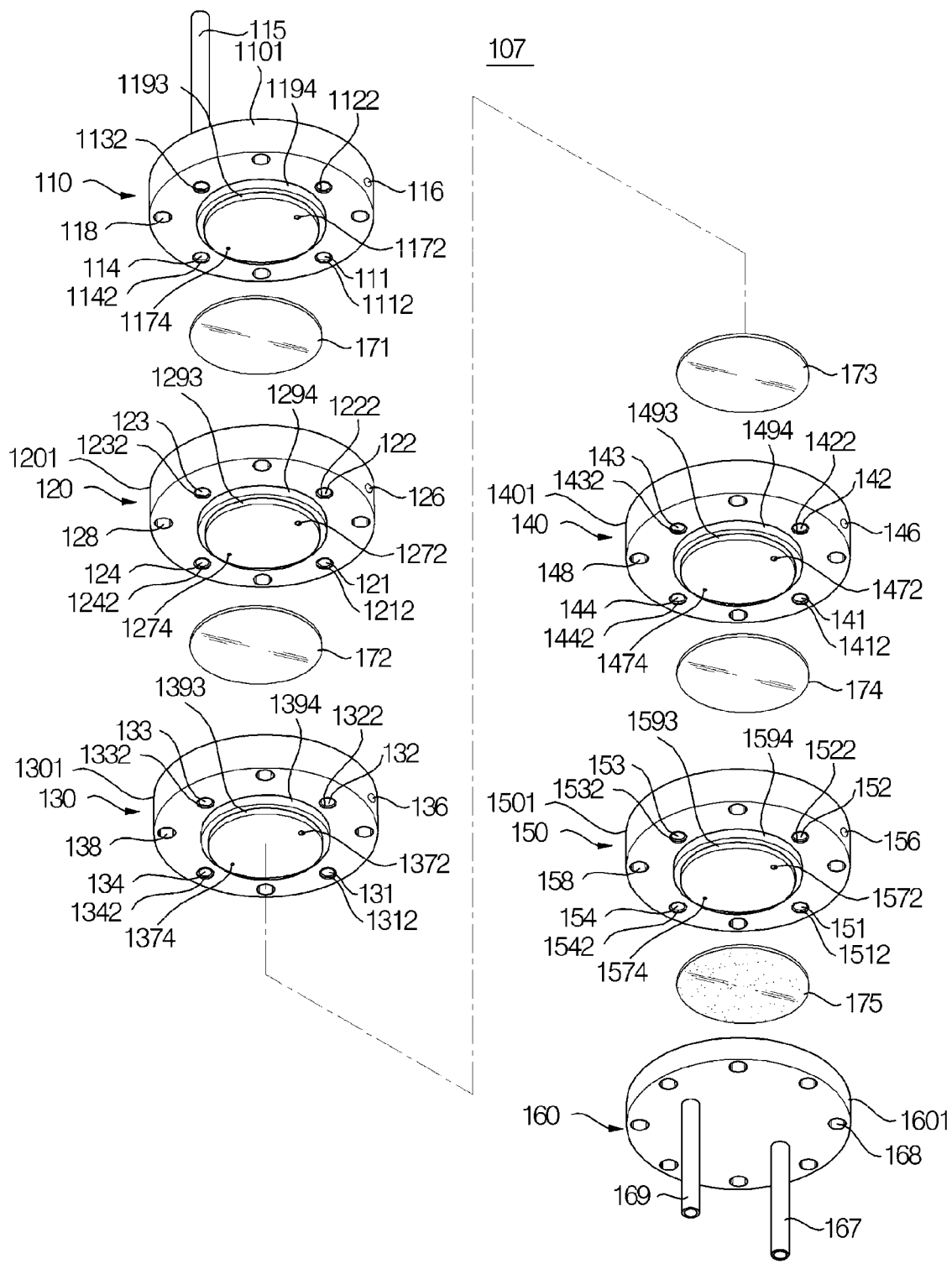
FIG. 4 is an exploded perspective view of the separation unit of the multilayer module for hydrogen separation of FIG. 1 as seen from a lower side.
Figure 5:
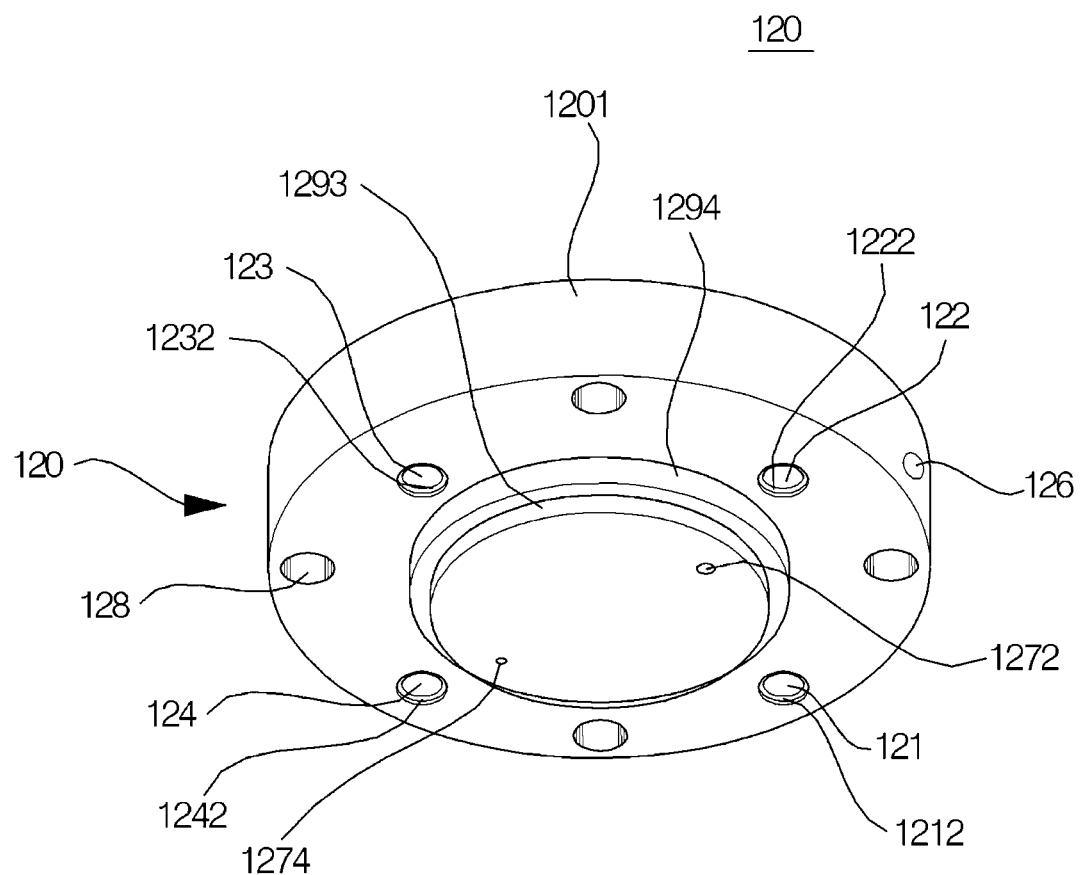
FIG. 5 is a perspective view of the unit cell of the multilayer module for hydrogen separation of FIG. 1 as seen from a lower side.

FIG. 1 illustrates a multilayer module for hydrogen separation 100 according to an embodiment of the present invention.

The multilayer module for hydrogen separation 100 basically includes a pressure chamber 102 and a separation unit 107 which is installed in the pressure chamber 102.

The pressure chamber 102 has a mixed gas supply pipe 104 which is installed on a side thereof to supply a mixed gas therein. The mixed gas supply pipe 104 is connected to a mixed gas supply source (not illustrated), and the mixed gas supplied from the mixed gas supply pipe 104 should have a pressure such that hydrogen is sufficiently passed through hydrogen separation plates 171, 172, 173 and 174.

The pressure chamber 102 may have a shape of the structure of a pressure container publicly known in the art, and should have sufficient space to install the separation unit 107 therein.

The separation unit 107 includes unit cells 120, 130, 140 and 150 which are laminated in two or more layers to separate hydrogen from the mixed gas, an upper plate 110 which is placed on an uppermost side of the unit cells 120, 130, 140 and 150 and has a retentate gas discharge pipe 115 disposed on an upper surface thereof, and a lower plate 160 which is placed on a lowermost side of the unit cells 120, 130, 140 and 150 and has hydrogen gas discharge pipes 167 and 169 disposed on a lower surface thereof.

One end of the retentate gas discharge pipe 115 and the each of one end of the hydrogen gas discharge pipes 167 and 169 penetrate a wall body of the pressure chamber 102 to be exposed to an outside thereof.

In particular, each of the unit cells 120, 130, 140 and 150 is communicated with an inner space of the pressure chamber 102. Herein, it is preferable that the upper plate 110 is communicated with the inner space of the pressure chamber 102, so that a hydrogen permeation reaction is carried out in the uppermost side unit cell 120 of unit cells 120, 130, 140 and 150.

The unit cells 120, 130, 140 and 150 have cell bodies 1201, 1301, 1401 and 1501, and the cell bodies 1201, 1301, 1401 and 1501 are each a plate having a polygonal, circular, or elliptical cross section.

The unit cells 120, 130, 140 and 150 include: support protrusions 125, 135, 145 and 155 formed on an upper recessed section of the cell bodies 1201, 1301, 1401 and 1501; hydrogen separation plates 171, 172, 173 and 174 which are disposed on the support protrusions 125, 135, 145 and 155 to pass only hydrogen therethrough; and mixed gas communication holes 122, 132, 142 and 152, retentate gas communication holes 124, 134, 144 and 154, and hydrogen gas communication holes 121, 123, 131, 133, 141, 143, 151 and 153, which are formed in the cell bodies 1201, 1301, 1401 and 1501 around the hydrogen separation plates 171, 172, 173 and 174, so as to be spaced apart from each other, respectively.

The unit cells 120, 130, 140 and 150 include: mixed gas input ports 126, 136, 146 and 156 which are formed in circumferential surfaces of the cell bodies 1201, 1301, 1401 and 1501 to be communicated with the mixed gas communication holes 122, 132, 142 and 152, and are exposed to the inner space of the pressure chamber 102 to be communicated therewith; mixed gas outlet holes 1272, 1372, 1472 and 1572 which are communicated with the mixed gas communication holes 122, 132, 142 and 152 through mixed gas passages 1262, 1362, 1462 and 1562, and are formed in the bottom of the cell bodies 1201, 1301, 1401 and 1501 to be exposed to the lower side; retentate gas input holes 1274, 1374, 1474 and 1574 which are communicated with the retentate gas communication holes 124, 134, 144 and 154 through retentate gas passages 1264, 1364, 1464 and 1564, and are formed in the bottom of the cell bodies 1201, 1301, 1401 and 1501 to be exposed to the lower side; and hydrogen gas inlet holes 1271, 1273, 1371, 1373, 1471, 1473, 1571 and 1573 which are formed between the support protrusions 125, 135, 145 and 155 and the lower portion of the hydrogen separation plates 171, 172, 173 and 174, and are communicated with the hydrogen gas communication holes 121, 123, 131, 133, 141, 143, 151 and 153 through hydrogen gas passages 1261, 1263, 1361, 1363, 1461, 1463, 1561 and 1563.

The unit cells 120, 130, 140 and 150 are disposed in the same direction, that is, in such a manner that the mixed gas communication holes 122, 132, 142 and 152 of the adjacent unit cells 120, 130, 140 and 150 coincide with the retentate gas communication holes 124, 134, 144 and 154 thereof.

Since the plurality of support protrusions 125, 135, 145 and 155 are formed, even when the upper portion of the hydrogen separation plates 171, 172, 173 and 174 is closed, gases may flow through spaces provided by the support protrusions 125, 135, 145 and 155. In the embodiment of the present invention, the support protrusions are formed in a plurality of concentric circular arcs each of which has substantially different curvatures at an interval. In addition, the hydrogen gas inlet holes 1271, 1273, 1371, 1373, 1471, 1473, 1571 and 1573 are exposed between the support protrusions 125, 135, 145 and 155.

The hydrogen separation plates 171, 172, 173 and 174 have a publicly known configuration, and allow hydrogen to be selectively passed therethrough. The hydrogen separation plates 171, 172, 173 and 174 may be formed in a foil form, or may be coated on a porous carrier made of a porous metal or porous ceramic by a coating method such as sputtering, electroless plating, electrolytic plating, spray coating, E-beam, or the like.

The hydrogen separation plates 171, 172, 173 and 174 are placed on the support protrusions 125, 135, 145 and 155 formed on the upper recessed section of the cell bodies 1201, 1301, 1401 and 1501, and the cell bodies 1201, 1301, 1401 and 1501 are configured in such a manner that a center portion thereof protrudes downward so as to provide a predetermined gap on the upper side of the hydrogen separation plates 171, 172, 173 and 174. Of course, the lower portion of the cell bodies 1201, 1301, 1401 and 1501 may be formed in a planar surface, and the upper surface of the hydrogen separation plates 171, 172, 173 and 174 may be disposed at a position lower than the upper surface of the cell bodies 1201, 1301, 1401 and 1501. However, in order to provide efficient sealing effects, it is preferable that the cell bodies 1201, 1301, 1401 and 1501 have a configuration in which the center portion thereof protrudes downward in the same manner as illustrated in this embodiment.

The mixed gas communication holes 122, 132, 142 and 152, the retentate gas communication holes 124, 134, 144 and 154, and the hydrogen gas communication holes 121, 123, 131, 133, 141, 143, 151 and 153 are spaced apart from one another, and disposed around the support protrusions 125, 135, 145 and 155. In the present invention, to increase the contact area of the hydrogen gas with the hydrogen separation plates 171, 172, 173 and 174 during filtering hydrogen gas from the mixed gas, the mixed gas communication holes 122, 132, 142 and 152 and the retentate gas communication holes 124, 134, 144 and 154 are arranged to face each other in a radial direction of the cell body, and the hydrogen gas communication holes 121, 123, 131, 133, 141, 143, 151 and 153 are arranged in a direction perpendicular to an imaginary straight line connecting the mixed gas communication holes 122, 132, 142 and 152 and the retentate gas communication holes 124, 134, 144 and 154.

Only one hydrogen gas communication hole 121, 123, 131, 133, 141, 143, 151 or 153 may be sufficient to discharge hydrogen gas, however, in order to efficiently discharge the separated hydrogen gas and prevent the concentration of pressure, a pair of hydrogen gas communication holes are formed in each unit cell 120, 130, 140 or 150 so as to be symmetrical with each other.

Figure 7:
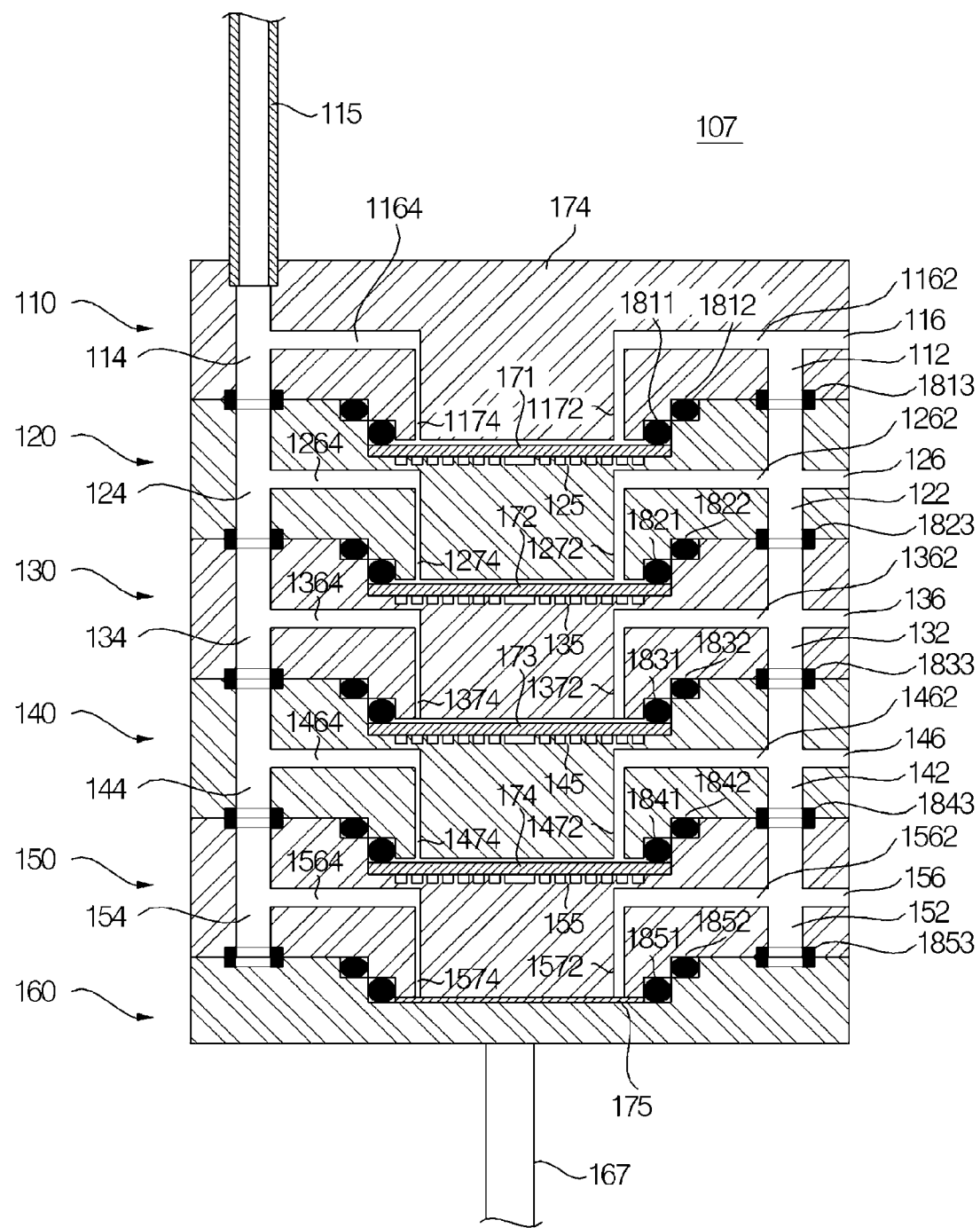
FIG. 7 is a vertical sectional view of the separation unit taken on line B-B of FIG. 1.

The hydrogen gas communication holes 121, 123, 131, 133, 141, 143, 151 and 153 are communicated with the hydrogen gas inlet holes 1271, 1273, 1371, 1373, 1471, 1473, 1571 and 1573 through the hydrogen gas passages 1261, 1263, 1361, 1363, 1461, 1463, 1561 and 1563 as illustrated in FIG. 7. The shape of the hydrogen gas passages 1261, 1263, 1361, 1363, 1461, 1463, 1561 and 1563 is not particularly limited, and it is preferable that the hydrogen gas communication holes 121, 123, 131, 133, 141, 143, 151 and 153 and the hydrogen gas inlet holes 1271, 1273, 1371, 1373, 1471, 1473, 1571 and 1573 are communicated in the shortest distance while having a shape which may be easily processed.

The mixed gas flows into a gap between the upper surface of the hydrogen separation plates 171, 172, 173 and 174 and the unit cells 120, 130 and 140 or the upper plate 110 which are placed on the hydrogen separation plates 171, 172, 173 and 174 from the mixed gas outlet holes 1272, 1372, 1472 and 1572 formed in the lower portion of the unit cells 120, 130 and 140 or an upper inlet hole 1172 formed in a lower surface of the upper plate 110. Remaining retentate gas separated from the mixed gas supplied into the gap between the upper surface of the hydrogen separation plates 171, 172, 173 and 174 and the unit cells 120, 130 and 140 or the upper plate 110 which are placed on the hydrogen separation plates 171, 172, 173 and 174 is discharged through the retentate gas input holes 1274, 1374, 1474 and 1574 formed in the lower portion of the unit cells 120, 130 and 140 or an upper outlet hole 1174 formed in the lower surface of the upper plate 110. Accordingly, the mixed gas outlet holes 1272, 1372, 1472 and 1572 are communicated with the retentate gas input holes 1274, 1374, 1474 and 1574 through the gap formed therein.

Therefore, the mixed gas outlet holes 1272, 1372, 1472 and 1572 are arranged near the mixed gas communication holes 122, 132, 142 and 152, and the retentate gas input holes 1274, 1374, 1474 and 1574 are arranged near the retentate gas communication holes 124, 134, 144 and 154. The mixed gas outlet holes 1272, 1372, 1472 and 1572 are communicated with the mixed gas communication holes 122, 132, 142 and 152 through the mixed gas passages 1262, 1362, 1462 and 1562, and the retentate gas input holes 1274, 1374, 1474 and 1574 are communicated with the retentate gas communication holes 124, 134, 144 and 154 through the retentate gas passages 1264, 1364, 1464 and 1564.

The mixed gas input ports 126, 136, 146 and 156 are formed in a side wall of the cell bodies 1201, 1301, 1401 and 1501 of the unit cells 120, 130, 140 and 150 so as to be exposed to the inner space of the pressure chamber 102, and the mixed gas input ports 126, 136, 146 and 156 are communicated with the mixed gas communication holes 122, 132, 142 and 152. Therefore, the mixed gas may flow inside of the pressure chamber 102 through the mixed gas communication holes 122, 132, 142 and 152.

The upper plate 110 includes a retentate gas discharge hole 114 whose one end portion is communicated with the retentate gas communication holes 124, 134, 144 and 154 of the unit cells 120, 130, 140 and 150 and the other end portion is communicated with the retentate gas discharge pipe 115.

The upper plate 110 includes an upper communication hole 112 which are communicated with the mixed gas communication hole of the unit cells 120, 130, 140 and 150; an upper inlet port 116 which is communicated with the upper communication hole 112 and is formed in a side portion of upper plate 110 to be exposed to the inner space of the pressure chamber 102 to be communicated therewith; an upper outlet hole 1172 which is communicated with the upper communication hole 112 through an upper inlet passage 1162 and is exposed to the lower side of the upper plate 110; and an upper inlet hole 1174 which is communicated with the retentate gas discharge hole 114 through an upper outlet passage 1164 and is exposed to the lower side of the upper plate 110. The upper inlet hole 1174 are communicated with the upper outlet hole 1172 through a gap between the lower surface of the upper plate 110 and the upper surface of the hydrogen separation plate 171.

Therefore, the upper plate 110 has a function of supplying the mixed gas to the uppermost hydrogen separation plate 171 and a function of discharging the remaining retentate gas in which the hydrogen is separated from the mixed gas. Accordingly, the upper outlet hole 1172 has the same position and shape as the mixed gas outlet holes 1272, 1372, 1472 and 1572, the upper inlet hole 1174 has the same position and shape as the retentate gas input holes 1274, 1374, 1474 and 1574, and the upper communication hole 112 and the retentate gas discharge hole 114 have the same position and shape as the mixed gas communication holes 122, 132, 142 and 152, and the retentate gas communication holes 124, 134, 144 and 154 of the unit cells 120, 130, 140 and 150.

The lower plate 160 includes hydrogen gas discharge holes 161 and 163 whose one end portion is communicated with hydrogen gas communication holes 151 and 153 of the unit cell 150, and the other end portion is communicated with hydrogen gas discharge pipes 167 and 169, respectively.

Particularly, the lower plate 160 should prevent the communication between the reaction gas inlet hole 152 and the hydrogen outlet hole 154 of the upper unit cell 150. For this, in the embodiment of the present invention, a gasket 175 is disposed between the upper surface of the lower plate 160 and the lower surface of the unit cell 150. That is, the gasket 175 is arranged at a position corresponding to the hydrogen separation plates 171, 172, 173 and 174 to prevent the communication between a mixed gas outlet hole 1572 and a retentate gas inlet hole 1574 of the unit cell 150.

It is preferable that the retentate gas input holes 1274, 1374, 1474 and 1574, and the upper outlet hole 1172 have a diameter smaller than the mixed gas outlet holes 1272, 1372, 1472 and 1572, and the upper inlet hole 1174. By this, the pressure of the retentate gas discharging from the retentate gas input holes 1274, 1374, 1474 and 1574 is increased, such that the hydrogen may easily flow through the hydrogen separation plates 171, 172, 173, 174 and 176.

In order to improve the sealing effect, in the embodiment of the present invention, each of the unit cells includes a pair of radial inner rings 1811, 1821, 1831, 1841 and 1851 and radial outer rings 1812, 1822, 1832, 1842 and 1852, which are arranged around the support protrusions 125, 135, 145 and 155. Further, each of the unit cells includes outside rings 1813, 1823, 1833, 1843 and 1853 which are arranged on the outside of the mixed gas communication holes 122, 132, 142 and 152, the retentate gas communication holes 124, 134, 144 and 154, and the hydrogen gas communication holes 121, 123, 131, 133, 141, 143, 151 and 153.

In order to mounting the radial inner and outer rings, each of unit cells includes upper radial inner ring seats 1291, 1391, 1491 and 1591 and upper radial outer ring seats 1292, 1392, 1492 and 1592, which are formed in a stepped shape around the support protrusions 125, 135, 145 and 155; and lower radial inner ring seats 1293, 1393, 1493 and 1593 and lower radial outer ring seats 1294, 1394, 1494 and 1594, which are formed on the under portion of the unit cells 120, 130, 140 and 150. The upper plate 110 includes a lower radial inner ring seat 1193 and a lower radial outer ring seat 1194, which are formed on the lower surface thereof; and an upper radial inner ring seat 1691 and an upper radial outer ring seat 1692, which are formed on the upper surface of the lower plate 160.

In order to mounting the outside rings, the lower plate 160 and the unit cells 120, 130, 140 and 150 include upper outside ring seats 1111, 1121, 1131, 1141, 1211, 1221, 1231, 1241, 1311, 1321, 1331, 1341, 1411, 1421, 1431, 1441, 1511, 1521, 1531, 1541, 1611, 1621, 1631 and 1641, which are formed in the respective communication holes on the upper surface thereof. In addition, the upper plate 110 and the unit cells 120, 130, 140 and 150 include lower outside ring seats 1112, 1122, 1132, 1142, 1212, 1222, 1232, 1242, 1312, 1322, 1332, 1342, 1412, 1422, 1432, 1442, 1512, 1522, 1532, 1542, 1612, 1622, 1632 and 1642, which are formed in the respective communication holes on the lower surface thereof.

Preferably, the radial inner rings 1811, 1821, 1831, 1841 and 1851, and the radial outer rings 1812, 1822, 1832, 1842 and 1852 include a metal ring. Generally, the metal ring refers to a seal made of a metallic material such as nickel, steel or the like. In order to improve the sealing force, it is preferable that the outer surface of the rings is coated with gold, silver, nickel or the like. Further preferably, the radial inner rings 1811, 1821, 1831, 1841 and 1851, and the radial outer rings 1812, 1822, 1832, 1842 and 1852 includes any one selected from a metal O-ring which is made of a metal tube and has a circular cross section, a metal C-ring which has a C-shaped cross section penetrating toward the center of the hydrogen separation plates 171, 172, 173 and 174, and a metal O-ring which has at least one hole penetrating toward the center of the hydrogen separation plate 171 with a circular cross section.

When the radial inner rings 1811, 1821, 1831, 1841 and 1851 are mounted on the hydrogen separation plates 171, 172, 173 and 174, it is preferable that the radial inner rings 1811, 1821, 1831, 1841 and 1851 have a diameter larger than the height of a predetermined gap formed on the hydrogen separation plates 171, 172, 173 and 174. Thereby, the radial inner rings 1811, 1821, 1831, 1841 and 1851 may be deformed, and may result in improving the sealing effect.

Figure 6:
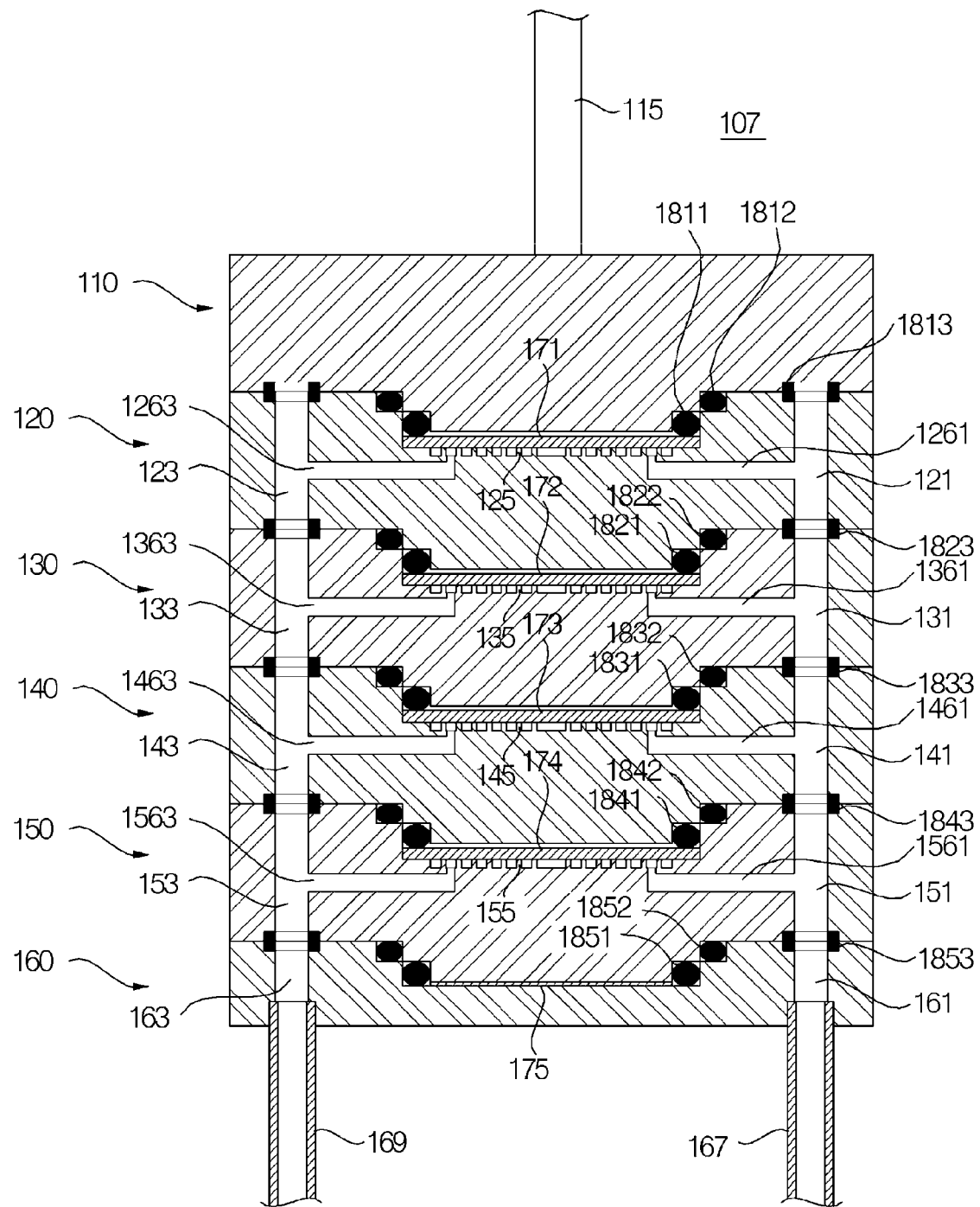
FIG. 6 is a vertical sectional view of the separation unit taken on line A-A of FIG. 1.

In addition, it is preferable that the outside rings 1813, 1823, 1833, 1843 and 1853 include a metal ring or graphite ring which may operate at a temperature of 550° C. or more. In FIGS. 6 and 7, the outside rings 1813, 1823, 1833, 1843 and 1853 have a rectangular cross section, but are not limited thereto, Further, the upper plate 110, the lower plate 160, and the unit cells 120, 130, 140 and 150 include upper fixing holes 118, lower fixing holes 168, and unit cell fixing holes 128, 138, 148 and 158 which are respectively formed at a peripheral edge thereof, such that the separation unit 107 is formed in a body by the fastening members 106 inserted into the above holes. The fastening member 106 may use a publicly known bolt and nut. In addition, the upper plate 110, the lower plate 160, and the unit cells 120, 130, 140 and 150 may be adhered by diffusion bonding or welding.

The multilayer module for hydrogen separation 100 according to the embodiment of the present invention is basically configured as described above. Next, an operation method of the multilayer module for hydrogen separation 100 will be described.

As illustrated in FIGS. 6 and 7, the separation unit 107 has four tubular bodies vertically formed therein. That is, the separation unit 107 has a second tubular body which is formed by the retentate gas communication holes 124, 134, 144 and 154 communicated with the retentate gas discharge pipe 115 and the retentate gas discharge hole 114; a first tubular body which is formed by the mixed gas communication holes 122, 132, 142 and 152 and the upper communication hole 112; a third and a fourth tubular bodies which are formed by the hydrogen gas communication holes 121, 123, 131, 133, 141, 143, 151, 153, 191 and 193, and the hydrogen gas discharge holes 161 and 163 communicated with the hydrogen gas discharge pipes 167 and 169, respectively.

First, a mixed gas supplied from the mixed gas supply pipe 104 fills the inner space of the pressure chamber 102 to increase the inner pressure, and flows into the first tubular body which is formed by the mixed gas communication holes 122, 132, 142 and 152 and the upper communication hole 112 through the upper inlet port 116 and the mixed gas input ports 126, 136, 146 and 156.

The mixed gas is uniformly distributed in the first tubular body, flows in the upper inlet passage 1162 and the mixed gas passages 1262, 1362, 1462 and 1562, and is supplied into the gap in the hydrogen separation plates 171, 172, 173 and 174 from the mixed gas outlet holes 1272, 1372, 1472 and 1572 and the upper outlet hole 1172.

Further, the mixed gas supplied into the gap is transmitted toward the support protrusions 125, 135, 145 and 155 through the hydrogen separation plates 171, 172, 173 and 174. In this regard, the retentate gas from which the hydrogen is removed flows in the retentate gas passages 1264, 1364, 1464 and 1564 and the upper outlet passage 1164 through the retentate gas input holes 1274, 1374, 1474 and 1574 and the upper inlet hole 1174, is supplied into the fourth tubular body, and is discharged to the outside through the retentate gas discharge pipe 115.

In addition, the hydrogen gas transmitted toward the support protrusions 125, 135, 145 and 155 through the hydrogen separation plates 171, 172, 173 and 174 flows in the hydrogen gas passages 1261, 1263, 1361, 1363, 1461, 1463, 1561 and 1563 through the hydrogen gas inlet holes 1271, 1273, 1371, 1373, 1471, 1473, 1571 and 1573, is supplied into the third and the fourth tubular bodies, and is discharged to the outside through the hydrogen gas discharge pipes 167 and 169.

The hydrogen gas discharge pipes 167 and 169 may be integrated into one tube on the outside of the pressure chamber 102, or only one hydrogen gas discharge pipe may be disposed on the separation unit 107.

According to the above-described configuration and operation, the unit cells 120, 130, 140 and 150 are pressurized by the mixed gas supplied through the pressure chamber 102. Herein, the mixed gas is supplied into each of the unit cells 120, 130, 140 and 150 via the mixed gas input ports 126, 136, 146 and 156 which are formed in the circumferential surfaces of the unit cells 120, 130, 140 and 150. Therefore, expanding pressure is not applied to the bonding and sealing regions in the module, and a mixture is transferred into each unit cell at the same pressure. Thereby, it is possible to provide a high efficiency large sized module with improved durability.

Figure 8:
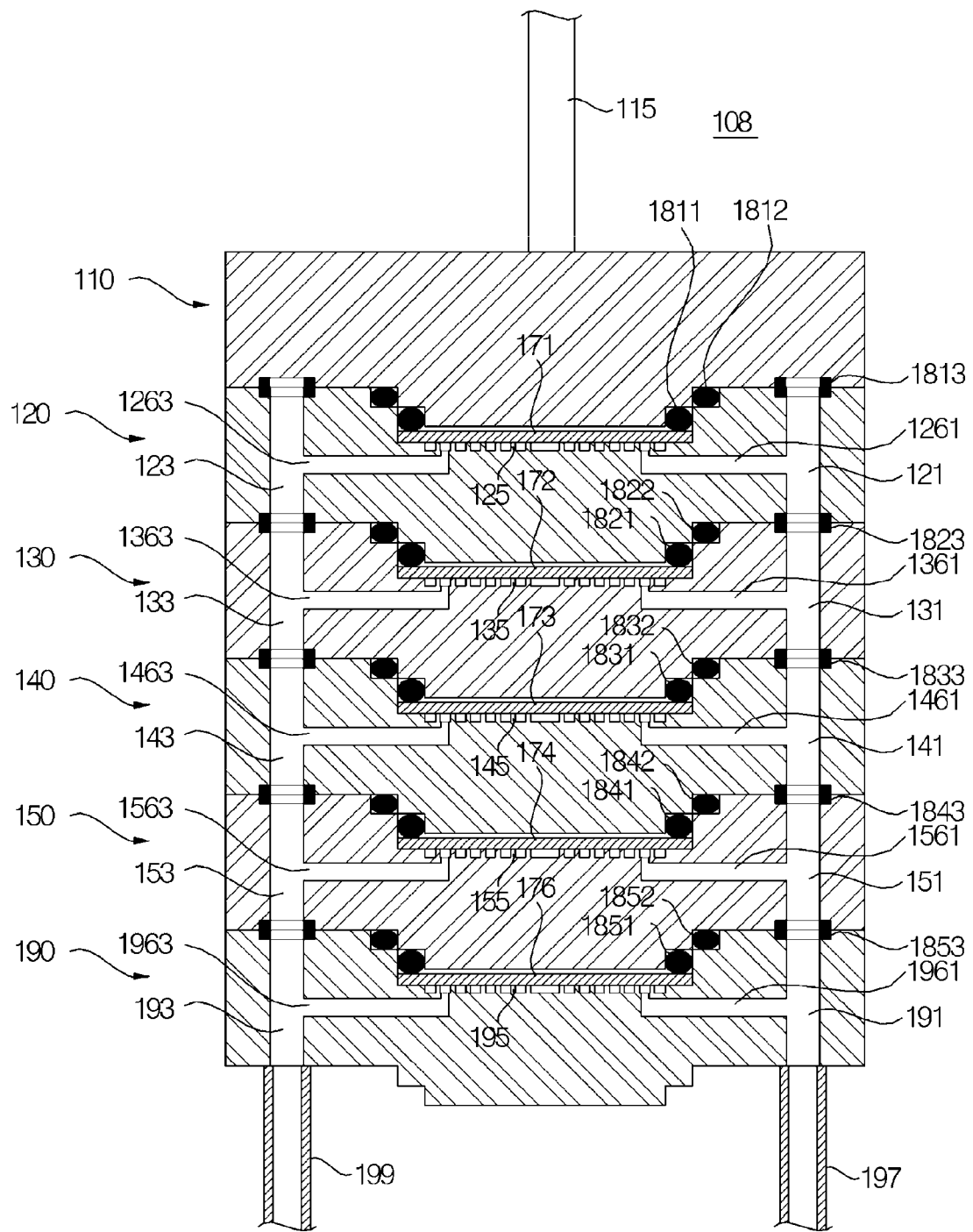
FIG. 8 is a vertical sectional view of a modified example of the separation unit shown in FIG. 1.
Figure 9:
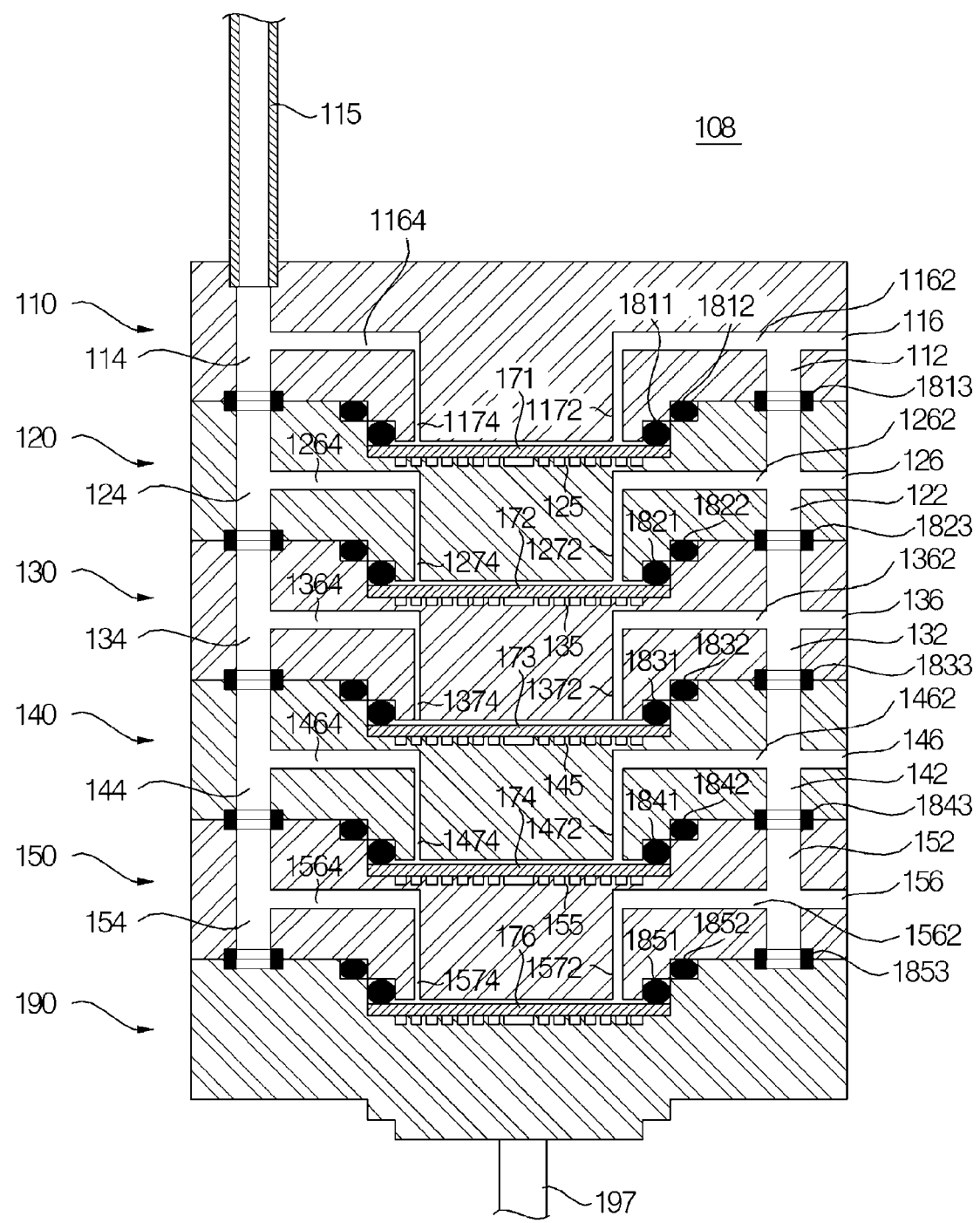
FIG. 9 is a vertical sectional view of the separation unit of FIG. 8 taken in a perpendicular direction.

In addition, as illustrated in FIGS. 8 and 9, which are cross-sectional views illustrating a separation unit 108 according to a modified example, when using the lower plate 190 having the same configuration as the unit cells 120, 130, 140 and 150 while preventing the flowing of the mixed gas therebetween, it is possible to increase the utilization of the lower plate 190. For this, in the unit cells 120, 130, 140 and 150, the lower plate closes the retentate gas communication holes, the mixed gas communication holes, the mixed gas outlet holes, the retentate gas inlet holes, and the mixed gas inlet ports, and includes hydrogen gas discharge pipes 197 and 199 disposed under the hydrogen gas communication holes 191 and 193. Further, a hydrogen separation plate 176 is disposed on the support protrusions 195 of the lower plate 190 in a space between the unit cell 150 and the lower plate 190. By this configuration, the lower plate may be formed by a unit cell which is identically manufactured in a manufacturing plant through an additional process, as well as the hydrogen separation reaction may occur in the lower plate 190.

Figure 10:
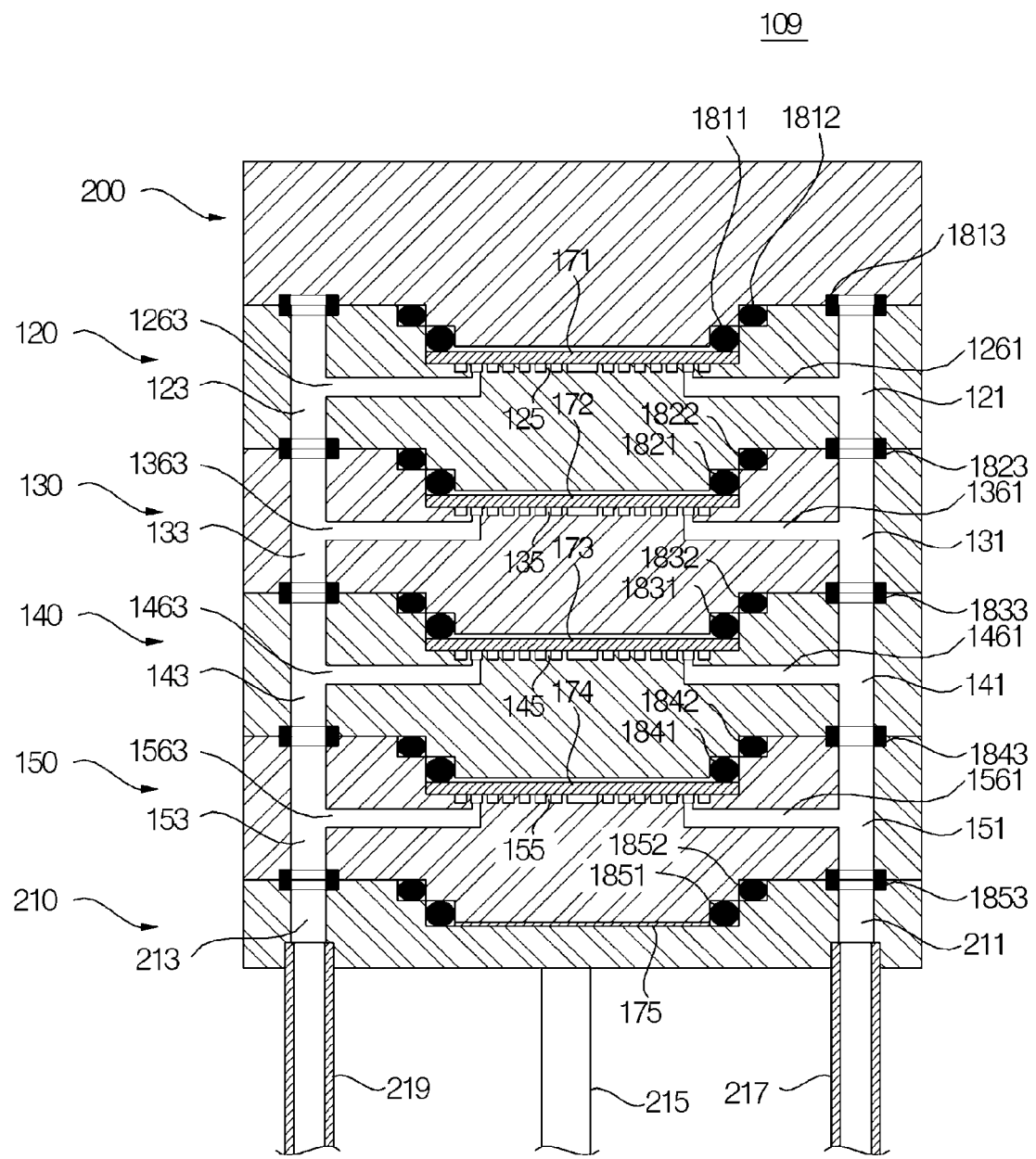
FIG. 10 is a vertical sectional view of another modified example of the separation unit shown in FIG. 1.
Figure 11:
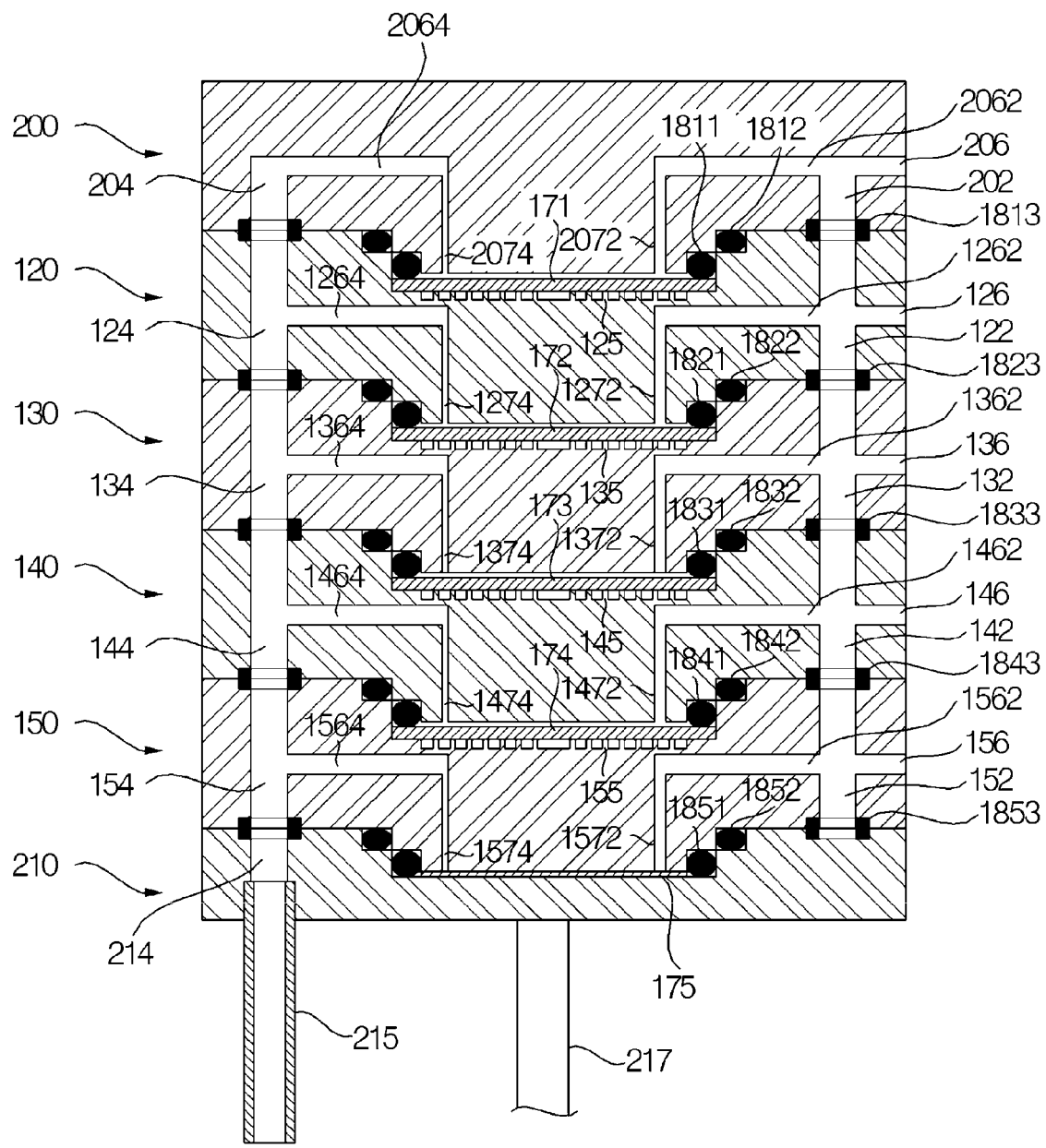
FIG. 11 is a vertical sectional view of the separation unit of FIG. 10 taken in a perpendicular direction.

Moreover, as illustrated in FIGS. 10 and 11, which are cross-sectional views illustrating a separation unit 109 according to another modified example, the retentate gas discharge pipe and the hydrogen gas discharge pipe are simultaneously disposed on the same side of any one of the upper plate and the lower plate. In this regard, when the number of the separation unit 109 is increased in one pressure chamber, it is possible to easily design the piping and increase the designer's degree of freedom in design. In FIGS. 10 and 11, all of the hydrogen gas discharge pipes 217 and 219 and the retentate gas discharge pipe 215 are disposed on the lower side of the lower plate, these pipes may be disposed on the upper side of the upper plate in the same manner.

In this regard, the upper plate 200 includes a retentate gas discharge hole 204 whose upper end is not exposed to the outside. In addition, the lower plate 210 includes a retentate gas discharge hole 214, and an upper end of a retentate gas display pipe 215 is inserted into the retentate gas discharge hole 214, so that the hydrogen discharge pipe 214 is communicated with the retentate gas discharge hole 204 and the retentate gas communication holes 124, 134, 144 and 154. The other configuration of the separation unit 109 is the same as that of the separation unit 107.

While the present invention has been described with reference to the preferred embodiments, the present invention is not limited to the above-described embodiments, and it will be understood by those skilled in the related art that various modifications and variations may be made therein without departing from the scope of the present invention as defined by the appended claims.

DESCRIPTION OF REFERENCE NUMERALS

100: multilayer module for hydrogen separation, 102: pressure chamber
104: mixed gas supply pipe, 106: fastening member
107, 108: separation unit, 110: upper plate
112: upper communication hole, 114, 204, 214: retentate gas discharge hole
115, 215: retentate gas discharge pipe, 116: upper inlet port
118: upper fixing hole, 120, 130, 140, 150, 190: unit cell
121, 123, 131, 133, 141, 143, 151, 153, 191, 193, 211, 213: hydrogen gas communication hole
122, 132, 142, 152: mixed gas communication hole, 124, 134, 154, 164: retentate gas communication hole
125, 135, 145, 155, 195: support protrusion, 126, 136, 146, 156: mixed gas input port
128, 138, 148, 158: unit cell fixing hole, 161, 163, 191, 193: hydrogen gas discharge hole
167, 169, 197, 199, 217, 219: hydrogen gas discharge pipe
168: lower fixing hole, 171, 172, 173, 174, 176: hydrogen separation plate
175: gasket, 1101: upper plate body
1111, 1121, 1131, 1141, 1211, 1221, 1231, 1241, 1311, 1321, 1331, 1341, 1411, 1421, 1431, 1441, 1511, 1521, 1531, 1541, 1611, 1621, 1631, 1641: upper outside ring seat
1112, 1122, 1132, 1142, 1212, 1222, 1232, 1242, 1312, 1322, 1332, 1342, 1412, 1422, 1432, 1442, 1512, 1522, 1532, 1542, 1612, 1622, 1632, 1642: lower outside ring seat
1162: upper inlet passage, 1164: upper outlet passage
1172: upper outlet hole, 1174: upper inlet hole
1201, 1301, 1401, 1501: cell body
1261, 1263, 1361, 1363, 1461, 1463, 1561, 1563, 1961, 1963: hydrogen gas passage
1262, 1362, 1462, 1562: mixed gas passage, 1264, 1364, 1464, 1564: retentate gas passage
1271, 1273, 1371, 1373, 1471, 1473, 1571, 1573: hydrogen gas inlet hole
1272, 1372, 1472, 1572: mixed gas outlet hole
1274, 1374, 1574, 1674: retentate gas input hole
1291, 1391, 1491, 1591, 1691: upper radial inner ring seat
1292, 1392, 1492, 1592, 1692: upper radial outer ring seat
1193, 1293, 1393, 1493, 1593: lower radial inner ring seat
1194, 1294, 1394, 1494, 1594: lower radial outer ring seat
1601: lower plate body
1811, 1821, 1831, 1841, 1851: radial inner ring
1812, 1822, 1832, 1842, 1852: radial outer ring
1813, 1823, 1833, 1843, 1853: outside ring

The invention claimed is:

1. A multilayer module for hydrogen separation comprising:
a pressure chamber having a mixed gas supply pipe which is disposed on a side thereof so as to be communicated therewith; and
a separation unit which is installed in the pressure chamber, wherein the separation unit comprises: at least two laminated unit cells which are configured to separate hydrogen from a mixed gas; an upper plate which is placed on each of the laminated unit cells at an uppermost side; and a lower plate which is placed on each of the laminated unit cells at a lowermost side,
at least one of the upper plate and the lower plate includes a hydrogen gas discharge pipe which are disposed thereon to discharge hydrogen separated from the separation unit, at least one of the upper plate and the lower plate includes a retentate gas discharge pipe which are disposed thereon to discharge a remaining retentate gas from which hydrogen has been separated by the separation unit, and
each of the unit cells is communicated with an inner space of the pressure chamber,
wherein each of the unit cells comprises:
a cell body forming a main body of each of the unit cells;
support protrusions formed on an upper recessed section of the cell body;
a hydrogen separation plate which is disposed on the support protrusions to pass only hydrogen therethrough;
a mixed gas communication hole, a retentate gas communication hole, and a hydrogen gas communication hole, which are formed in the cell body around the hydrogen separation plate, so as to be spaced apart from each other;
a mixed gas input port which is formed in circumferential surfaces of the cell body thereof to be communicated with the mixed gas communication hole, and is exposed to the inner space of the pressure chamber to be communicated therewith;

a mixed gas outlet hole which is communicated with the mixed gas communication hole through a mixed gas passage, and is formed in the bottom of the cell body to be exposed to a hydrogen separation plate of another unit cell adjacent thereto;

a retentate gas input hole which is communicated with the retentate gas communication hole through the retentate gas passage, and is formed in the bottom of the cell body to be exposed to the hydrogen separation plate of the other unit cell adjacent thereto;

a hydrogen gas inlet hole which is formed between the support protrusions and the lower portion of the hydrogen separation plate, and is communicated with the hydrogen gas communication hole through hydrogen gas passage, the hydrogen gas discharge pipe is communicated with the hydrogen gas communication hole, the retentate gas discharge pipe is communicated with the retentate gas communication hole, and a gap is formed between a lower surface of an upper unit cell and the hydrogen separation plate in the adjacent unit cell so as to communicate the mixed gas outlet hole with the retentate gas inlet hole therethrough.

2. The multilayer module for hydrogen separation according to claim 1, wherein either of the upper plate or the lower plate has the same configuration as each of the unit cells, the mixed gas communication hole is closed, the hydrogen gas discharge communication hole in which the hydrogen gas discharge pipe is not inserted is closed, and the retentate gas discharge hole in which the retentate gas discharge pipe is not inserted is closed.

3. The multilayer module for hydrogen separation according to claim 1, wherein a gasket is disposed between the upper surface of the lower plate and the lower surface of each of the unit cells.

4. The multilayer module for hydrogen separation according to claim 1, wherein the retentate gas inlet hole has a diameter smaller than the diameter of the mixed gas outlet hole.

5. The multilayer module for hydrogen separation according to claim 1, wherein the mixed gas supply pipe has a diameter larger than the diameter of the retentate gas discharge pipe.

* * * * *